United States Patent
Risdon et al.

(10) Patent No.: US 10,634,121 B2
(45) Date of Patent: Apr. 28, 2020

(54) VARIABLE RATED SPEED CONTROL IN PARTIAL LOAD OPERATION OF A WIND TURBINE

(71) Applicant: General Electric Company, Schenectady, NY (US)

(72) Inventors: Ryan Andrew Risdon, Greenville, SC (US); Jignesh Govindlal Gandhi, Simpsonville, SC (US); Mark Edward Cardinal, Altamont, NY (US); Govardhan Ganireddy, Roanoke, VA (US); Arne Koerber, Berlin (DE)

(73) Assignee: General Electric Company, Schenectady, NY (US)

( * ) Notice: Subject to any disclaimer, the term of this patent is extended or adjusted under 35 U.S.C. 154(b) by 231 days.

(21) Appl. No.: 15/623,493

(22) Filed: Jun. 15, 2017

(65) Prior Publication Data
US 2018/0363628 A1  Dec. 20, 2018

(51) Int. Cl.
*F03D 7/04* (2006.01)
*F03D 7/02* (2006.01)
*F03D 1/02* (2006.01)

(52) U.S. Cl.
CPC ........... *F03D 7/047* (2013.01); *F03D 7/0276* (2013.01); *F03D 7/043* (2013.01); *F03D 1/02* (2013.01); *F05B 2270/1011* (2013.01); *F05B 2270/1012* (2013.01); *F05B 2270/335* (2013.01); *G05B 2219/2619* (2013.01); *Y02E 10/70* (2013.01)

(58) Field of Classification Search
None
See application file for complete search history.

(56) References Cited

U.S. PATENT DOCUMENTS

| | | | |
|---|---|---|---|
| 4,703,189 | A | 10/1987 | DiValentin et al. |
| 5,155,375 | A | 10/1992 | Holly |
| 5,652,485 | A | 7/1997 | Spiegel et al. |
| 5,798,631 | A | 8/1998 | Spec et al. |
| 6,856,041 | B2 | 2/2005 | Siebenthaler et al. |

(Continued)

FOREIGN PATENT DOCUMENTS

| | | |
|---|---|---|
| AU | 2006215082 B2 | 8/2006 |
| DE | 102009022236 A1 | 5/2009 |

(Continued)

OTHER PUBLICATIONS

"Understanding Coefficient of Power (Cp) and Betz Limit" Kidwind Science Snack: Betz Limit.

(Continued)

*Primary Examiner* — Sean Shechtman
(74) *Attorney, Agent, or Firm* — Dority & Manning, P.A.

(57) ABSTRACT

A method for operating a wind turbine during partial load operation includes determining a power output of the wind turbine. The method also includes determining whether the power output is below a rated power of the wind turbine. If the power output is at the rated power, the method includes maintaining a speed set point of the wind turbine equal to a rated speed set point. However, if the power output is below the rated power, then the method includes varying, via a controller, the speed set point of the wind turbine as a function of a torque of the wind turbine in a non-monotonic torque-speed relationship.

17 Claims, 8 Drawing Sheets

(56) References Cited

U.S. PATENT DOCUMENTS

| | | | |
|---|---|---|---|
| 6,888,262 B2 | 5/2005 | Blakemore | |
| 7,004,724 B2 | 2/2006 | Pierce et al. | |
| 7,081,689 B2 | 7/2006 | Tilscher et al. | |
| 7,175,389 B2 | 2/2007 | Moroz | |
| 7,261,672 B2 | 8/2007 | Frank et al. | |
| 7,281,891 B2 | 10/2007 | Smith et al. | |
| 7,342,323 B2 | 3/2008 | Avagliano et al. | |
| 7,346,462 B2 | 3/2008 | Delmerico | |
| 7,351,033 B2 | 4/2008 | McNerney | |
| 7,352,075 B2 | 4/2008 | Willey et al. | |
| 7,420,289 B2 | 9/2008 | Wang et al. | |
| 7,476,485 B2 | 1/2009 | Hatakeyama et al. | |
| 7,476,985 B2 | 1/2009 | Llorente Gonzalez | |
| 7,504,738 B2 | 3/2009 | Barton et al. | |
| 7,505,833 B2 | 3/2009 | Delmerico et al. | |
| 7,573,149 B2 | 8/2009 | Kammer et al. | |
| 7,586,206 B2 | 9/2009 | Barton et al. | |
| 7,602,075 B2 | 10/2009 | Erdman et al. | |
| 7,613,548 B2 | 11/2009 | Cardinal et al. | |
| 7,704,043 B2 | 4/2010 | Kabatzke et al. | |
| 7,750,490 B2 | 7/2010 | Scholte-Wassink | |
| 7,808,126 B2 | 10/2010 | Stiesdal | |
| 7,822,560 B2 | 10/2010 | LeMieux | |
| 7,861,583 B2 | 1/2011 | Honhoff et al. | |
| 7,870,783 B2 | 1/2011 | Yoshida et al. | |
| 7,883,317 B2 | 2/2011 | Ormel et al. | |
| 7,942,629 B2 | 5/2011 | Shi et al. | |
| 7,950,901 B2 | 5/2011 | Barbu et al. | |
| 7,964,979 B2 | 6/2011 | Miranda et al. | |
| 7,979,167 B2 | 7/2011 | Delmerico et al. | |
| 7,994,658 B2 | 8/2011 | Cardinal et al. | |
| 8,025,476 B2 | 9/2011 | Zheng et al. | |
| 8,035,241 B2 | 10/2011 | Subramanian et al. | |
| 8,050,887 B2 | 11/2011 | Ahmann | |
| 8,050,899 B2 | 11/2011 | Giguere et al. | |
| 8,093,737 B2 | 1/2012 | Wittekind et al. | |
| 8,121,738 B2 | 2/2012 | Teichmann et al. | |
| 8,128,362 B2 | 3/2012 | Andersen et al. | |
| 8,183,707 B2 | 5/2012 | Siebers et al. | |
| 8,210,811 B2 | 7/2012 | Loh et al. | |
| 8,212,373 B2 | 7/2012 | Wittekind et al. | |
| 8,257,040 B2 | 9/2012 | Chen et al. | |
| 8,262,354 B2 | 9/2012 | Hoffmann | |
| 8,269,363 B2 | 9/2012 | Arinaga | |
| 8,301,310 B2 | 10/2012 | Nim | |
| 8,328,514 B2 | 12/2012 | Viripullan et al. | |
| 8,360,722 B2 | 1/2013 | Hoffmann et al. | |
| 8,441,138 B2 | 5/2013 | Gjerlov et al. | |
| 8,610,306 B2 | 12/2013 | Kirchner | |
| 8,698,334 B2 | 4/2014 | Bo et al. | |
| 8,704,393 B2 | 4/2014 | Perley et al. | |
| 8,779,611 B2 | 7/2014 | Kabatzke et al. | |
| 8,793,027 B2 | 7/2014 | Nyborg et al. | |
| 8,858,174 B2 | 10/2014 | Lee et al. | |
| 9,014,861 B2 | 4/2015 | Attia | |
| 9,200,614 B2 | 12/2015 | Godsk | |
| 9,361,606 B2 | 6/2016 | Hertel et al. | |
| 9,551,321 B2 | 1/2017 | Gerber et al. | |
| 9,587,628 B2 | 3/2017 | Narayana et al. | |
| 9,605,558 B2 | 3/2017 | Perley et al. | |
| 9,624,905 B2 | 4/2017 | Perley et al. | |
| 9,631,606 B2 | 4/2017 | Slack et al. | |
| 2003/0185665 A1 | 10/2003 | Hansen | |
| 2006/0273595 A1 | 12/2006 | Avagliano et al. | |
| 2008/0195255 A1 | 8/2008 | Lutze et al. | |
| 2009/0001724 A1 | 1/2009 | Lee et al. | |
| 2009/0088991 A1 | 4/2009 | Brzezowski et al. | |
| 2009/0099702 A1 | 4/2009 | Vyas et al. | |
| 2009/0220340 A1 | 9/2009 | Pierce et al. | |
| 2009/0295159 A1 | 12/2009 | Johnson et al. | |
| 2010/0098540 A1 | 4/2010 | Fric et al. | |
| 2010/0241280 A1 | 9/2010 | Garcia Barace et al. | |
| 2010/0283245 A1 | 11/2010 | Gjerlov et al. | |
| 2010/0312594 A1 | 12/2010 | Andersen et al. | |
| 2011/0064573 A1* | 3/2011 | Viripullan | F03D 7/024 416/1 |
| 2011/0084485 A1 | 4/2011 | Miranda et al. | |
| 2011/0140425 A1 | 6/2011 | Staedler | |
| 2011/0142634 A1 | 6/2011 | Menke et al. | |
| 2011/0153096 A1 | 6/2011 | Pal et al. | |
| 2012/0014794 A1 | 1/2012 | Bailey | |
| 2012/0027586 A1 | 2/2012 | Hoffman et al. | |
| 2012/0078517 A1 | 3/2012 | Bogucki | |
| 2012/0086209 A1 | 4/2012 | Obrecht | |
| 2012/0133138 A1 | 5/2012 | Sorensen et al. | |
| 2012/0161444 A1 | 6/2012 | Tarnowski | |
| 2012/0165996 A1 | 6/2012 | Olesen | |
| 2013/0033040 A1 | 2/2013 | Bowyer et al. | |
| 2013/0156577 A1 | 6/2013 | Esbensen et al. | |
| 2013/0181450 A1 | 7/2013 | Narayana et al. | |
| 2013/0243590 A1 | 9/2013 | Edenfeld | |
| 2014/0217742 A1* | 8/2014 | Caruso | F03D 1/0608 290/55 |
| 2014/0288855 A1 | 9/2014 | Deshpande | |
| 2015/0159625 A1* | 6/2015 | Hardwicke, Jr. | F03D 7/0272 290/44 |
| 2015/0167637 A1 | 6/2015 | Kooijman et al. | |
| 2015/0267686 A1 | 9/2015 | Kjaer et al. | |
| 2015/0377216 A1 | 12/2015 | Deshpande et al. | |
| 2016/0065105 A1 | 3/2016 | Hardwicke, Jr. et al. | |
| 2016/0222944 A1 | 8/2016 | Stoltenjohannes et al. | |

FOREIGN PATENT DOCUMENTS

| | | |
|---|---|---|
| EP | 2302207 A1 | 3/2011 |
| EP | 1798413 B1 | 1/2012 |
| EP | 2444659 A1 | 4/2012 |
| EP | 2 492 499 A1 | 8/2012 |
| EP | 2063111 B1 | 12/2013 |
| EP | 3 032 095 A1 | 6/2016 |
| EP | 2463518 B1 | 11/2016 |
| EP | 3 351 789 A1 | 7/2018 |
| ES | 2545535 T3 | 9/2015 |
| ES | 2586802 T3 | 10/2016 |
| IN | 200700978 P2 | 7/2007 |
| IN | 200602033 I3 | 8/2008 |
| IN | 201404569 P1 | 2/2015 |
| IN | 201502582 P1 | 9/2015 |
| IN | 201505796 P1 | 1/2016 |
| IN | 271727 B | 3/2016 |
| JP | 05799159 B2 | 10/2015 |
| WO | WO2005010358 A1 | 2/2005 |
| WO | WO2008124185 A1 | 10/2008 |
| WO | WO2010069534 A1 | 6/2010 |
| WO | WO2011000531 A2 | 1/2011 |
| WO | WO2011015383 A2 | 2/2011 |
| WO | WO2011076818 A2 | 6/2011 |
| WO | WO2011076875 A2 | 6/2011 |
| WO | WO2011101475 A2 | 8/2011 |
| WO | WO2011157271 A2 | 12/2011 |
| WO | WO2011160634 A1 | 12/2011 |
| WO | WO2012044161 A2 | 4/2012 |
| WO | WO2012103668 A1 | 8/2012 |
| WO | WO2012149984 A1 | 11/2012 |
| WO | WO2012164387 A1 | 12/2012 |
| WO | WO2013000468 A1 | 1/2013 |
| WO | WO2013091638 A1 | 6/2013 |
| WO | WO2016119791 A1 | 8/2016 |
| WO | WO2016138906 A1 | 9/2016 |

OTHER PUBLICATIONS

Extended European Search Report and Opinion issued in connection with corresponding EP Application No. 18176766.6 dated Oct. 18, 2018.

\* cited by examiner

VARIABLE RATED SPEED CONTROL IN PARTIAL LOAD OPERATION OF A WIND TURBINE

FIELD

The present invention relates generally to wind turbines, and more particularly, to systems and methods for controlling a wind turbine in partial load operation using a variable rated speed set point.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

At low wind speeds, there is insufficient torque exerted by the wind on the rotor blades to make them rotate. However, as the wind speed increases, the rotor of the wind turbine begins to rotate and generate electrical power. The wind speed at which the wind turbine first starts to rotate and generate power is generally referred to as the cut-in wind speed. As the wind speed rises above the cut-in wind speed, the level of electrical power rises rapidly until the power output reaches the limit that the electrical generator of the wind turbine is capable of, which is generally referred to as the rated power output. Similarly, the wind speed at which the rated power is reached is generally referred to as the rated wind speed. At wind speeds above the rated wind speed, the wind turbine is designed to limit the power output to the rated power. To avoid damage to the wind turbine, a braking system is typically employed when the wind speed reaches a cut-out wind speed. Thus, for conventional operation, the rated wind speed is a constant value. In other words, when the rotor reaches the rated power from an increase in wind speed, it maintains that value as winds continue to increase.

Typically, the wind turbine operates such that it reaches a rated rotor speed at a wind speed at or below the rated wind speed. In the upper partial load region of operation, defined on a torque-speed curve as the portion at rated speed and increasing torque to rated power, the wind turbine experiences lower performance due to operating away from its optimal tip speed ratio (TSR). Such operation introduces the potential for reduced aerodynamic efficiency and the need to mitigate that potential. Increasing the rotor speed allows the wind turbine to maintain optimum TSR operation up to a higher wind speed; however, the system is electrically, mechanically, and/or thermally limited such that it cannot maintain the higher generator speed at rated power levels.

Accordingly, a system and method that addresses the aforementioned problems would be welcomed in the technology. For example, a system and method that incorporates a variable rated speed set point in partial load operation of the wind turbine would be advantageous.

BRIEF DESCRIPTION

Aspects and advantages of the invention will be set forth in part in the following description, or may be obvious from the description, or may be learned through practice of the invention.

In one aspect, the present subject matter is directed to a method for operating a wind turbine during partial load operation. The method includes determining a power output of the wind turbine. The method also includes determining whether the power output is below a rated power of the wind turbine. If the power output is at the rated power, the method includes maintaining a speed set point of the wind turbine equal to a rated speed set point. However, if the power output is below the rated power and an operational space exists below system constraints of the wind turbine, then the method includes varying, via the controller, the speed of the wind turbine based on a non-monotonic torque-speed relationship.

In another embodiment, the step of varying the speed of the wind turbine based on the non-monotonic torque-speed relationship may include operating to an increased speed set point of the wind turbine above the rated speed set point at rated power until at least one of the system constraints are reached. Further, the step of varying the speed of the wind turbine based on the non-monotonic torque-speed relationship may include decreasing the speed of the wind turbine as a function of the torque after reaching the increased speed set point of the wind turbine above the rated speed set point until rated power is reached. More specifically, in such embodiments, the method may include decreasing the speed of the wind turbine back to the rated speed set point after at least one of the system constraints are reached.

In further embodiments, the method may include dynamically calculating the increased speed set point as a function of the torque or power of the wind turbine. More specifically, in certain embodiments, the step of dynamically calculating the increased speed set point as a function of the torque or the power of the wind turbine may include receiving, via a turbine controller, the electrical constraints of one or more components from a converter controller of the wind turbine in real-time, calculating a plurality of intermediate speed set points as a function of the torque of the wind turbine for the electrical constraints, and selecting one of the plurality of intermediate speed set points to be the speed set point.

In alternative embodiments, the method may include determining the increased speed set point based on the torque or the power via one or more look-up tables.

In several embodiments, the method may further include increasing one or more over-speed condition margins of the wind turbine in response to varying the speed set point of the wind turbine as a function of a torque of the wind turbine.

It should be understood that the system constraint(s) may include mechanical constraints, electrical constraints, and/or thermal constraints of one or more components of the wind turbine. More specifically, in such embodiments, the mechanical constraints of the one or more components of the wind turbine may include loads determined by direct measurement, loads calculated based on internal models of the controller, loads calculated based on operational history of the wind turbine, loads calculated based on a wind resource, simulated loading profiles, or combinations thereof. Further, the electrical constraints of the one or more components of the wind turbine may include a grid condition, a reactive power demand, converter current margins, converter voltage margins, cable ampacity, internal or external power commands, a grid strength, ambient conditions, thermal margins, temperature, or similar.

In another aspect, the present disclosure is directed to a system for operating a wind turbine during partial load operation. The system includes a controller having one or more processors. The processor(s) are configured to perform one or more operations, including but not limited to providing a rated power for the wind turbine and comparing a power output of the wind turbine with the rated power. If the power output is at the rated power, the processor is configured to maintain a speed set point of the wind turbine equal to a rated speed set point. Alternatively, if the power output is below the rated power, the processor is configured to vary the speed of the wind turbine based on a non-monotonic torque-speed relationship. It should be understood that the system may also include any of the additional features described herein.

In yet another aspect, the present subject matter is directed to a method for operating a wind turbine during partial load operation. The method includes providing a rated power for the wind turbine. If a power output of the wind turbine is at the rated power, the method includes maintaining a speed of the wind turbine equal to a rated speed set point. In contrast, however, if the power output is below the rated power, the method includes operating the speed of the wind turbine based on a non-monotonic torque-speed relationship and system constraints of the wind turbine. It should be understood that the method may also include any of the additional steps and/or features described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods that utilize a variable speed set point that is introduced into the controller in an effort to improve the partial-load performance of a wind turbine that is speed-limited in its partial-load operation condition. Such control systems are particularly useful for wind turbines that operate using doubly-fed induction generators (DFIGs). For conventional wind turbines, the rated speed set point is a constant value. Thus, when the rotor first reaches the rated speed set point from an increase in wind speed, it maintains that value even as wind speeds continue to increase. In the present disclosure, however, the speed set point for the partial load operation condition is higher than the speed set point at rated power. As such, the present disclosure utilizes the existing system margins at below-rated power operation. Further, the new torque-speed curve is a non-monotonic curve that is defined by a new constraint that follows the electrical, mechanical, or thermal system capability curve in upper partial load.

As used herein, non-monotonic operation refers to a relationship between two operating conditions that is not continuously increasing or decreasing. More specifically, a non-monotonic speed-torque relationship is defined as when torque increases, the speed does not always increase as torque increases, rather at a certain point (e.g. an inflection point), speed will start to decrease as torque continues to increase. In contrast, monotonicity refers generally to the characteristic of a function with a first derivative that does not change sign, which is characteristic of standard torque-speed operation. Non-monotonicity is the converse, in which determining whether the dependent variable is decreasing depends on the value and direction of the independent variable.

The various embodiments of the system and method described herein provide numerous advantages not present in the prior art. For example, the controller change can be implemented using existing turbine software. Further, by increasing the rotor speed, the systems and methods of the present disclosure allow the wind turbine to maintain optimum tip speed ratio operation up to a higher wind speed so as to maintain the peak region of the power coefficient longer. Thus, the present disclosure expands the operational space of the wind turbine and increases power performance. In addition, the present disclosure improves stall margin for fouled or iced blades.

Figure 1:
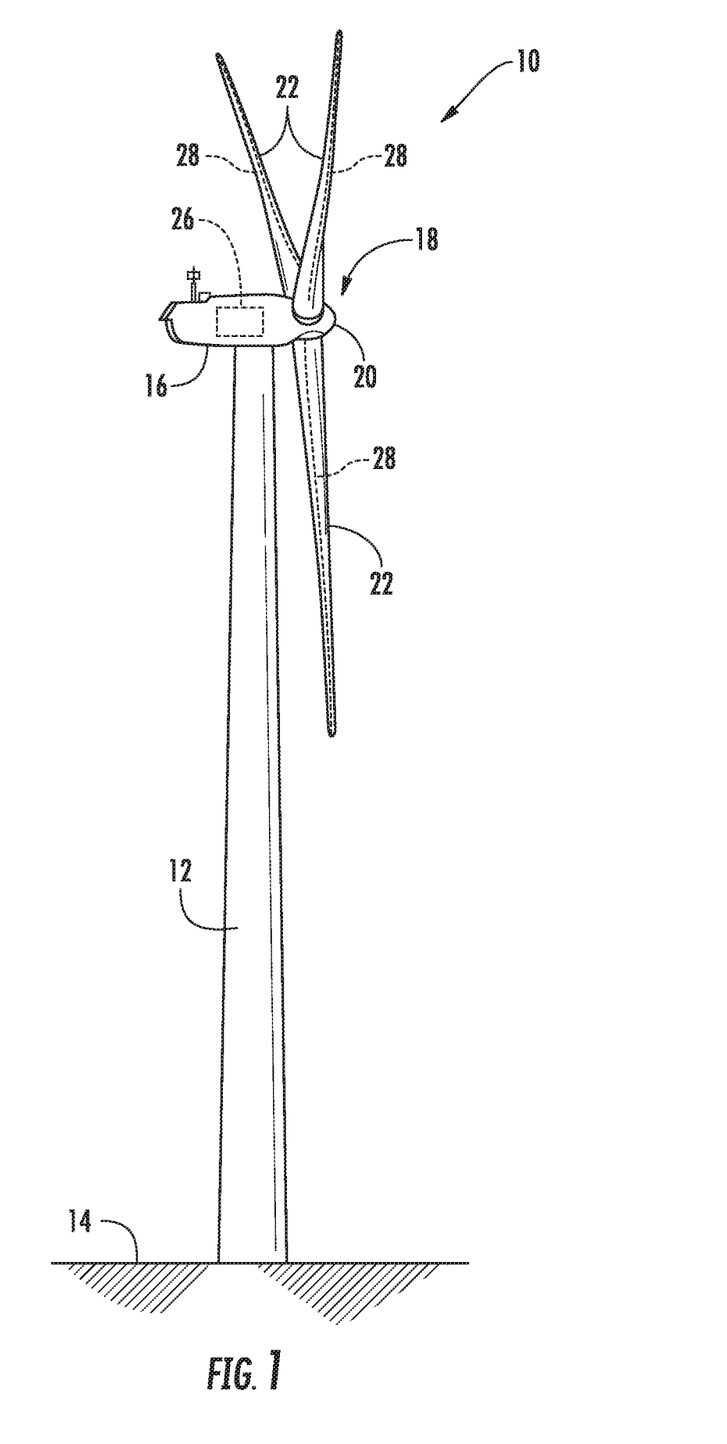
FIG. 1 illustrates a perspective view of one embodiment of a wind turbine according to the present disclosure.

Referring now to the figures, FIG. 1 illustrates a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
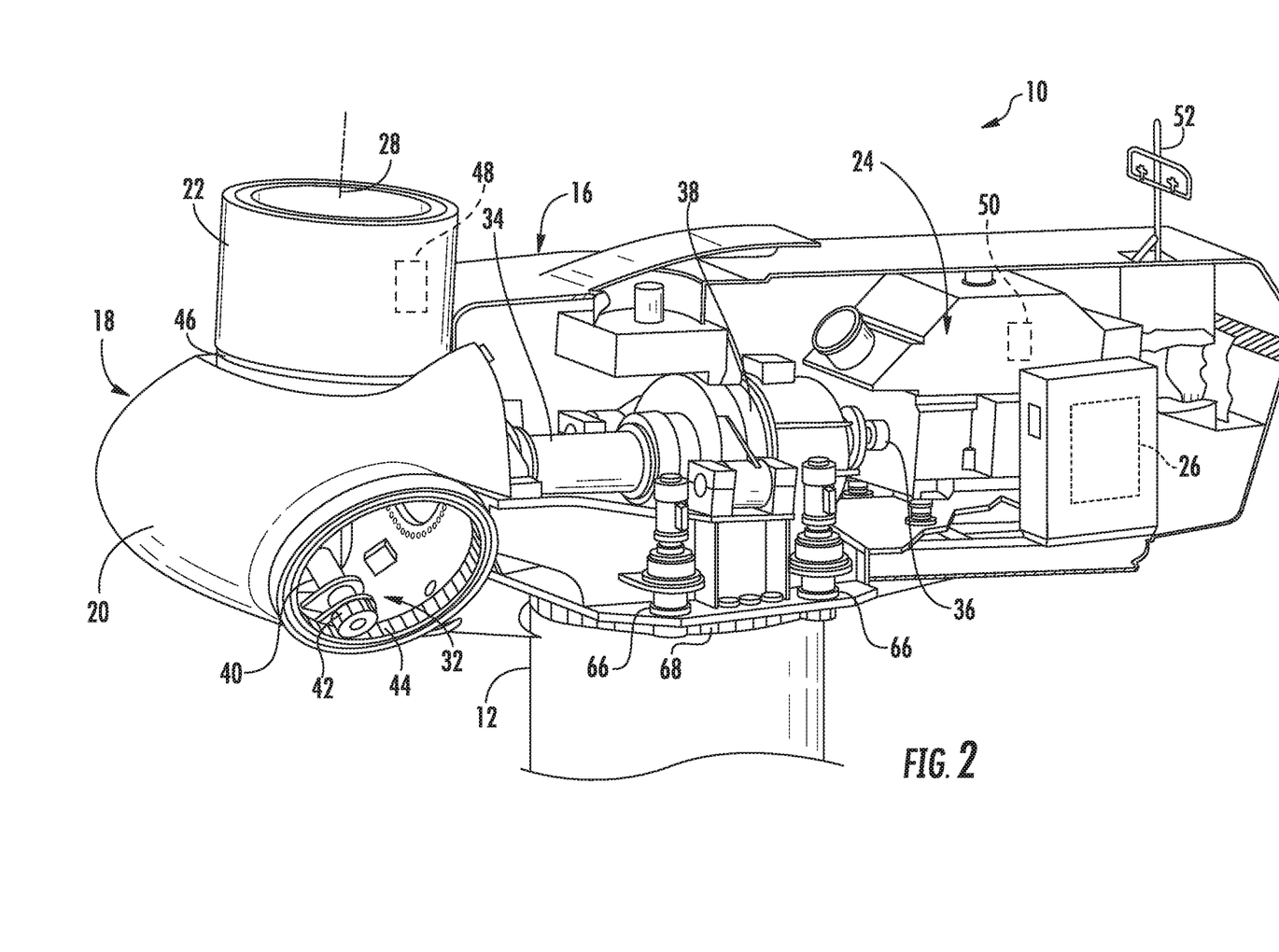
FIG. 2 illustrates a detailed, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. In further embodiments, the wind turbine 10 may employ direct drive pitch or a separate pitch drive systems including hydraulics. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 2, the wind turbine 10 may also include one or more sensors 48, 50, 52 for measuring operating and/or loading conditions of the wind turbine 10. For example, in various embodiments, the sensors may include blade sensors 48 for measuring a pitch angle of one of the rotor blades 22 or for measuring a loading acting on one of the rotor blades 22; generator sensors 50 for monitoring the generator 24 (e.g. torque, speed, acceleration and/or the power output); and/or various wind sensors 52 for measuring various wind parameters, such as wind speed, wind peaks, wind turbulence, wind shear, changes in wind direction, air density, or similar. Further, the sensors may be located near the ground of the wind turbine 10, on the nacelle 16, or on a meteorological mast of the wind turbine 10. It should also be understood that any other number or type of sensors may be employed and at any location. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 3:
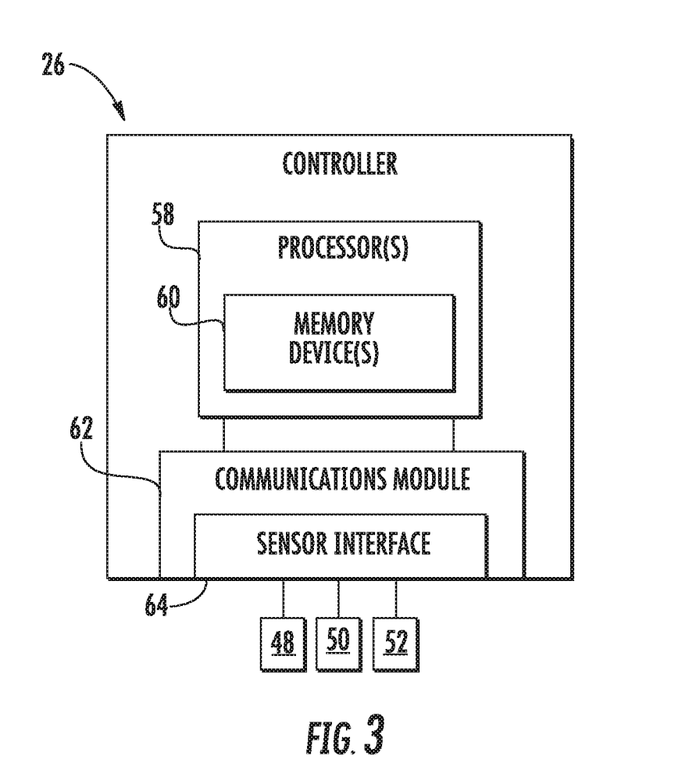
FIG. 3 illustrates a schematic diagram of one embodiment of a controller of a wind turbine according to the present disclosure.

Referring now to FIG. 3, a block diagram of one embodiment of the controller 26 according to the present disclosure is illustrated. As shown in FIG. 3, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50, 52 to be converted into signals that can be understood and processed by the processors 58. It should be appreciated that the sensors 48, 50, 52 may be communicatively coupled to the communications module 62 using any suitable means. For example, as shown in FIG. 3, the sensors 48, 50, 52 are coupled to the sensor interface 64 via a wired connection. However, in other embodiments, the sensors 48, 50, 52 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, a graphics processing unit (GPUs), and/or other programmable circuits now known or later developed. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions as described herein.

Figure 4:
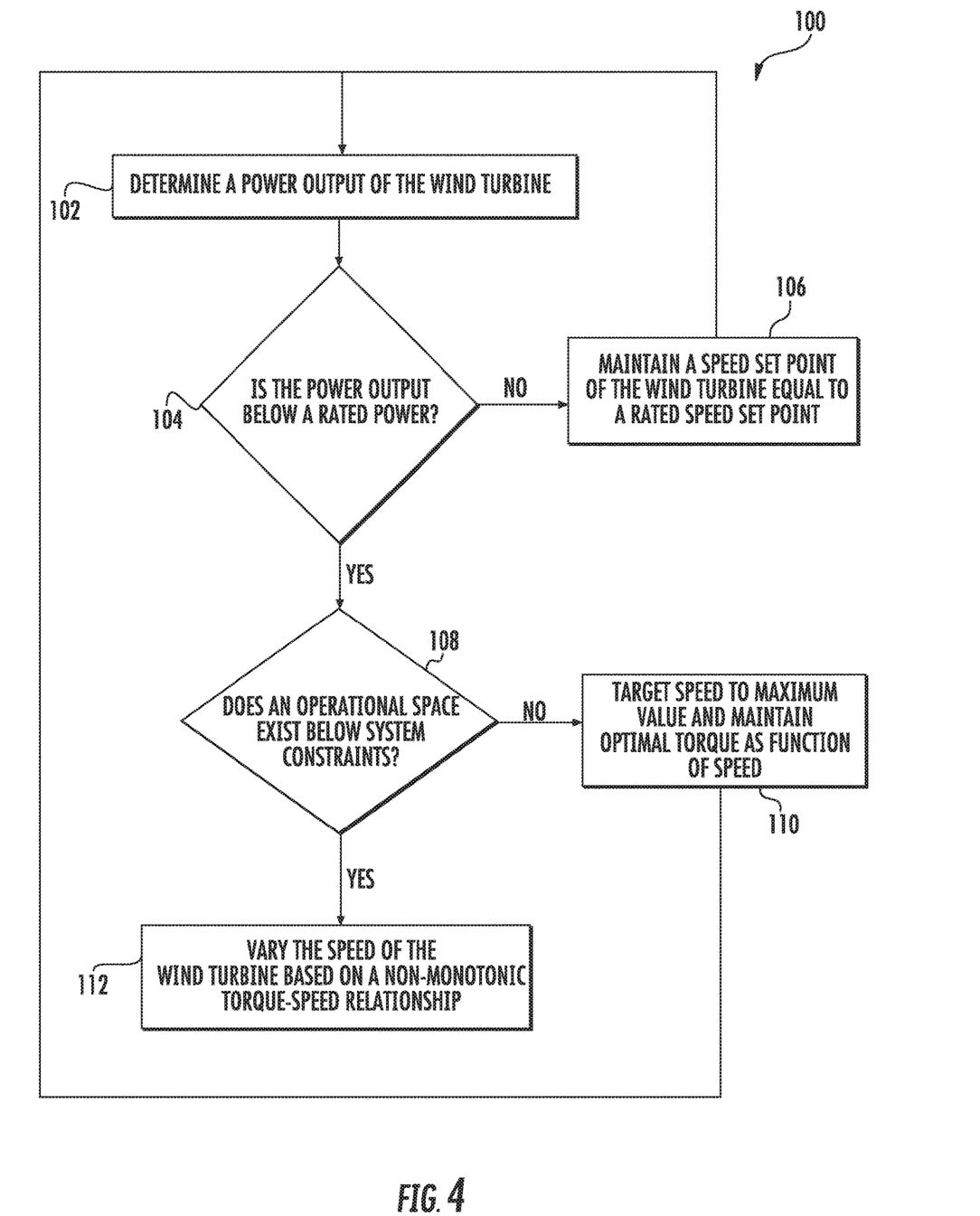
FIG. 4 illustrates a flow diagram of one embodiment of a method for operating a wind turbine during partial load operation according to the present disclosure.

Referring now to FIG. 4, a flow diagram of one embodiment of a method 100 for operating a wind turbine (e.g. the wind turbine 10 of FIG. 1) during partial load operation is illustrated. As used herein, "partial load operation" generally refers to operation of the wind turbine 10 below rated power. In other words, during partial load operation, the wind turbine 10 is producing less than rated power. Thus, as shown at 102, the method 100 includes determining a power output of the wind turbine 10. As shown at 104, the method 100 includes determining whether the power output is below the rated power of the wind turbine 10. If the power output is at the rated power, as shown at 106, the method 100 includes maintaining a speed of the wind turbine equal to a rated speed set point.

However, if the power output is below the rated power, as shown at 108, the method 100 also includes determining whether a torque set point of the wind turbine 10 is at or above a system constraint of the wind turbine 10. If the torque set point is below system constraint(s), as shown at 110, the method 100 may include targeting the speed set point to a maximum value and maintaining optimal torque as a function of the speed. If the torque set point is at or above system constraints, however, as shown at 112, then the method 100 includes varying (e.g. via the controller 26) the speed of the wind turbine based on a non-monotonic torque-speed relationship. For example, in one embodiment, the controller 26 may be configured to increase the speed of the wind turbine 10 above the rated speed set point as a function of the torque until at least one of mechanical constraints, electrical constraints, or thermal constraints of one or more components of the wind turbine 10 are reached. More specifically, the mechanical constraints of the one or more components of the wind turbine 10 may include loads determined by direct measurement, loads calculated based on internal models of the controller, loads calculated based on operational history of the wind turbine, loads calculated based on a wind resource, simulated loading profiles, or combinations thereof. Further, the electrical constraints of the one or more components of the wind turbine 10 may include a grid condition, a reactive power demand, converter current margins, converter voltage margins, cable ampacity, internal or external power commands, a grid strength, ambient conditions, thermal margins, temperature, or similar.

Figure 5:
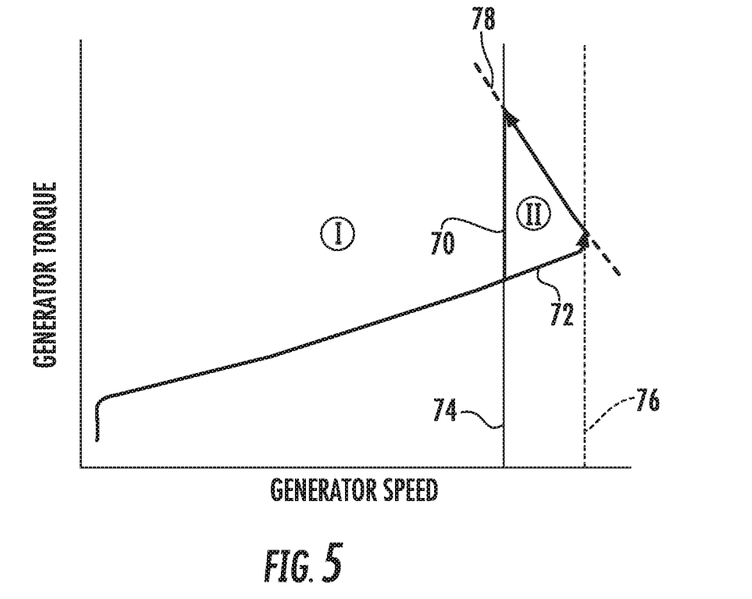
FIG. 5 illustrates a graph of one embodiment of generator torque (x-axis) versus generator speed (y-axis) according to the present disclosure.

Referring now to FIG. 5, a graph illustrating a non-monotonic torque-speed curve according to the present disclosure that follows the electrical and/or mechanical system limits is illustrated. Further, a monotonic baseline torque-speed curve is represented by reference character 70, whereas the new non-monotonic torque-speed curve is represented as 72. As shown in Region I, the generator speed in the rated power operation of the wind turbine 10 remains the same when this new curve is applied and the higher rated speed set point is applied only at below rated power. As shown in Region II, however, the new control method permits an increase in the rated speed set point in partial load operation of the wind turbine 10, e.g. as shown from rated speed set point 74 to increased speed set point 76, a constant speed as shown along line 76, and a subsequent decrease in the speed as shown from the increased speed set point 76 back the rated speed set point 74. As such, in certain embodiments, the wind turbine 10 is configured to follow the non-monotonic control curve 72 according to the newly defined limits as a function of torque.

The applicability of the non-monotonic torque-speed curve 72 is determined by the torque achieved in the generator and the power converter of the wind turbine 10 (not shown). For example, for conventional systems, there is a single variable speed region that increases torque at a defined slope from a minimum speed to a maximum speed. The slope is defined by maintaining an optimal tip speed ratio. In contrast, as shown in FIG. 5, the new torque-speed curve 72 first increases the rated speed set point (i.e. from 74 to 76).

After the speed of the wind turbine 10 reaches the increased speed set point 76, the non-monotonic torque-speed curve 72 maintains the maximum operational speed until one or more system limits are reached. (FIG. 5). The controller 26 may then decrease the speed of the wind turbine 10 as a function of the torque from the increased speed set point 76 of the wind turbine 10. For example, in such embodiments, the controller 26 may decrease the speed of the wind turbine 10 back to the rated speed set point 70 after at least one of the mechanical constraints, the electrical constraints, or the thermal constraints of one or more components of the wind turbine 10 are reached. More specifically, as shown in FIG. 5, once the non-monotonic torque-speed curve 72 reaches the higher rated speed set point 76 in partial load, the controller 26 is configured to apply an additional constraint on the torque-speed curve 72 at torque levels above the torque achieved when the system limit(s) is first reached. As such, the additional constraint may follow the system capability curve 78. It should be further understood that system capability curve 78 may shift according to the environmental and/or grid conditions of the wind turbine 10 and takes into account electrical, mechanical, and/or thermal constraints of the wind turbine 10.

In particular embodiments, the controller 26 may dynamically calculate the increased speed set point 76 as a function of the torque, power, and/or other sensed inputs to the controller 26. More specifically, in such embodiments, the controller 26 may receive one or more electrical constraints of one or more components from a converter controller of the wind turbine 10 in real-time. Thus, the controller 26 can use the electrical constraints to calculate a plurality of intermediate speed set points as a function of the torque of the wind turbine 10. Further, the controller 26 may select one of the plurality of intermediate speed set points to be the speed set point and the process may be updated as the electrical constraints change. In alternative embodiments, the controller 26 may determine the increased speed set point 76 based on the torque or power of the wind turbine 10 via one or more look-up tables.

Figure 6:
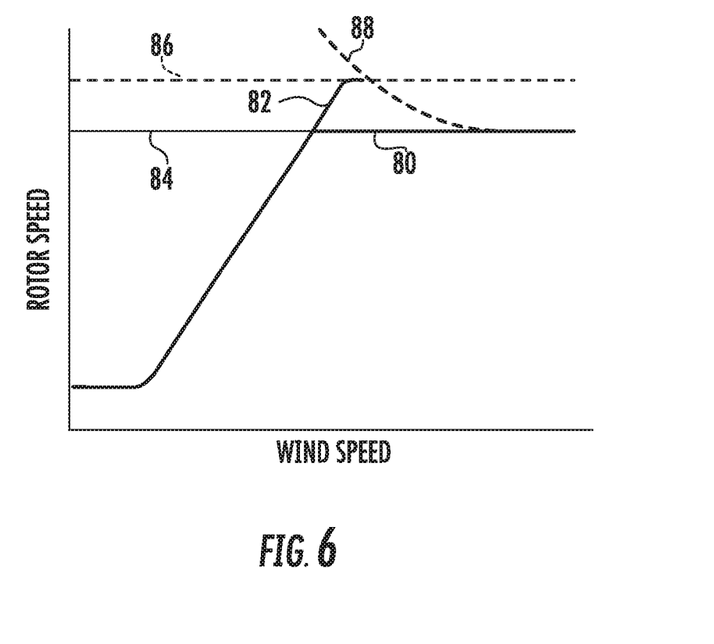
FIG. 6 illustrates a graph of one embodiment of rotor speed (x-axis) versus wind speed (y-axis) according to the present disclosure.
Figure 7:
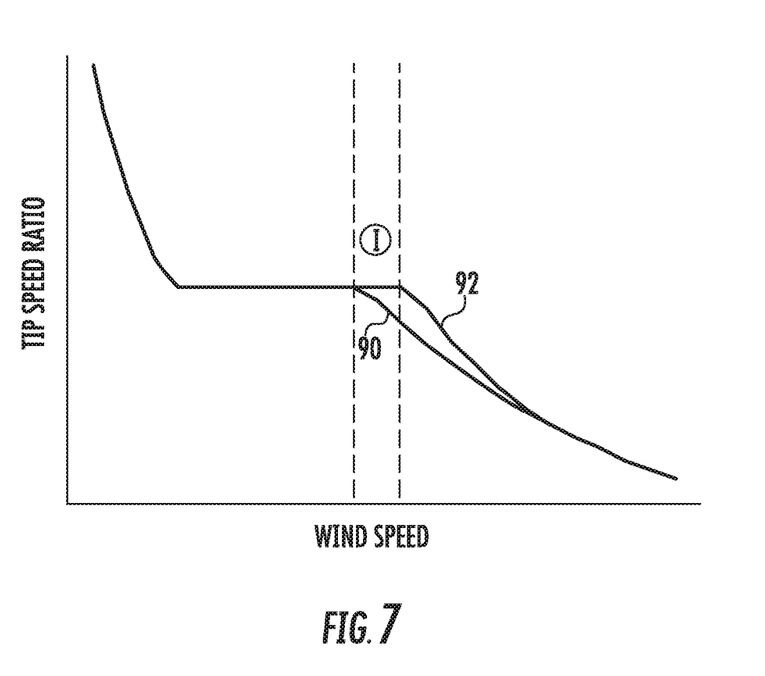
FIG. 7 illustrates a graph of one embodiment of TSR (x-axis) versus wind speed (y-axis) according to the present disclosure.
Figure 8:
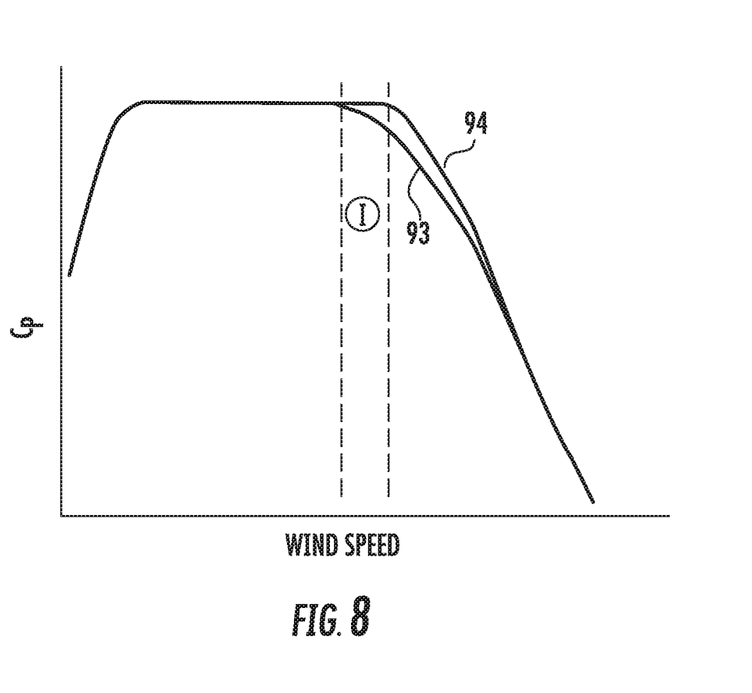
FIG. 8 illustrates a graph of one embodiment of power coefficient (x-axis) versus wind speed (y-axis) according to the present disclosure.
Figure 9:
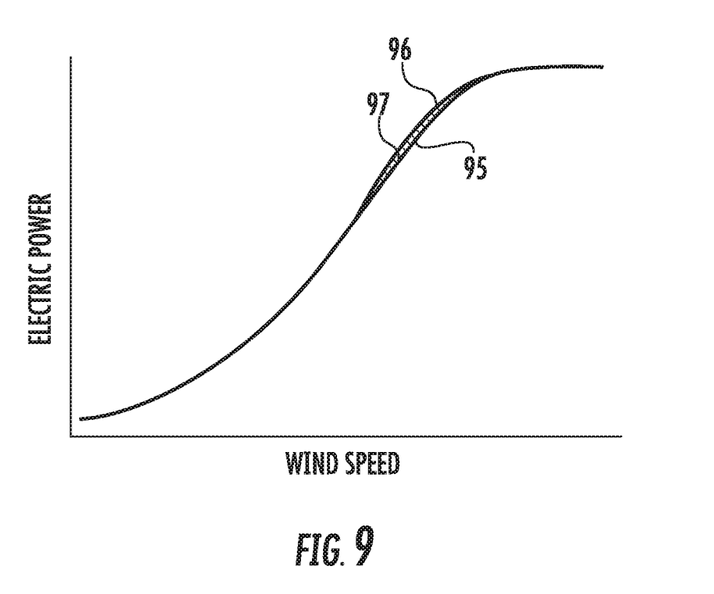
FIG. 9 illustrates a graph of one embodiment of electrical power (x-axis) versus wind speed (y-axis) according to the present disclosure.

Advantages of the present disclosure can be further understood with respect to the graphs illustrated in FIGS. 6-9, which depict the operational characteristics of the wind turbine 10 for a baseline control method and the control method of the present disclosure. More specifically, FIG. 6 illustrates a graph of rotor speed (y-axis) versus wind speed (x-axis); FIG. 7 illustrates a graph tip speed ratio (TSR) (y-axis) versus wind speed (x-axis); FIG. 8 illustrates a graph of the power coefficient $C_p$ (y-axis) versus wind speed (x-axis), and FIG. 9 illustrates a graph of electrical power versus (y-axis) versus wind speed (x-axis).

Referring particularly to FIG. 6, curve 80 represents the rotor speed for a conventional control scheme, whereas curve 82 represents the rotor speed according to the present disclosure. As shown, a higher rated speed set point 86 is achieved (as compared to the original rated speed set point 84 of conventional systems). Subsequently, the control scheme of the present disclosure follows the electromechanical constraint curve 88 to return the rated rotor speed set point 86 to its original rated speed set point 84 at rated power.

As shown in FIG. 7, a performance benefit of the present disclosure is further illustrated by the extension of the constant optimal tip speed ratio line 92 (as compared to baseline TSR line 90) to higher wind speeds by achieving a higher rated rotor speed (as shown in Region I). The constant TSR line 92 follows the optimum TSR for the rotor blade 22, thus achieving a higher power coefficient $C_p$ as shown in FIG. 8. More specifically, as shown in Region I of FIG. 8, the new power coefficient $C_p$ 94 is extended as compared to the conventional power coefficient $C_p$ 93. Thus, as shown in FIG. 9, a performance increase 97 (i.e. the area between the baseline power output 95 and the new power output 96) is achieved by operating the wind turbine 10 to follow its electrical constraint at below-rated power and above-rated speed.

Figure 10:
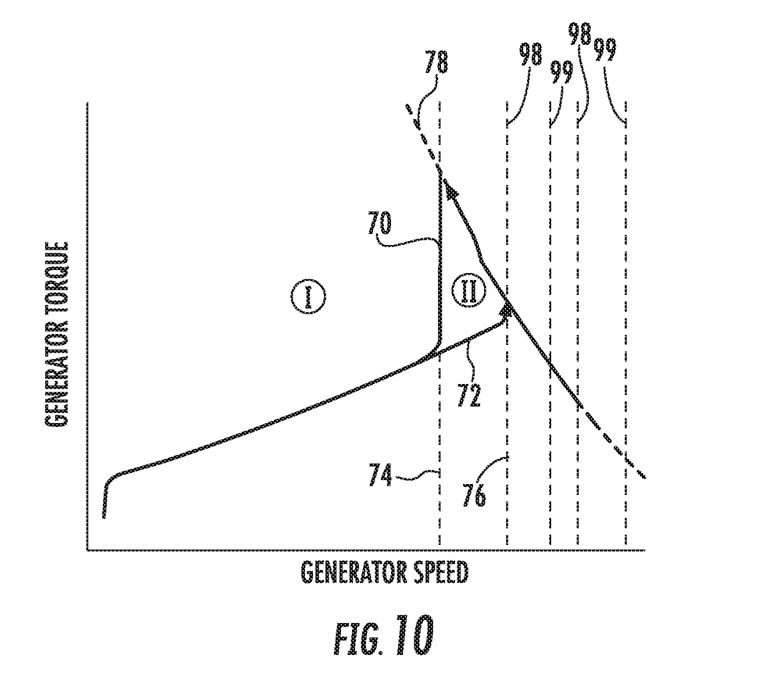
FIG. 10 illustrates a graph of another embodiment of generator torque (x-axis) versus wind speed (y-axis) according to the present disclosure, particularly illustrating increased over-speed condition margins.

In certain instances, increasing the speed as described above may cause an increase in the over-speed set points of the wind turbine protection system. As such, the present disclosure also provides for certain over-speed handling techniques. For example, as shown in FIG. 10, the new over-speed margins 99 can be maintained at their current ratios to the baseline rated speed set point 74 and increased proportionally to the higher rated speed set point 76 (as compared to the baseline over-speed margins 98). In other words, as shown, the higher rated speed set point 76 is configured to have negative loads impacts on gravity-driven loads by increasing the number of cycles in the fatigue evaluation. In additional embodiments, the new over-speed margins can be dynamically calculated, e.g. using proportional scaling of the over-speed margins to intermediate speed set points, a constant increase in the margins, and/or alternative over-speed handling procedures.

Figure 11:
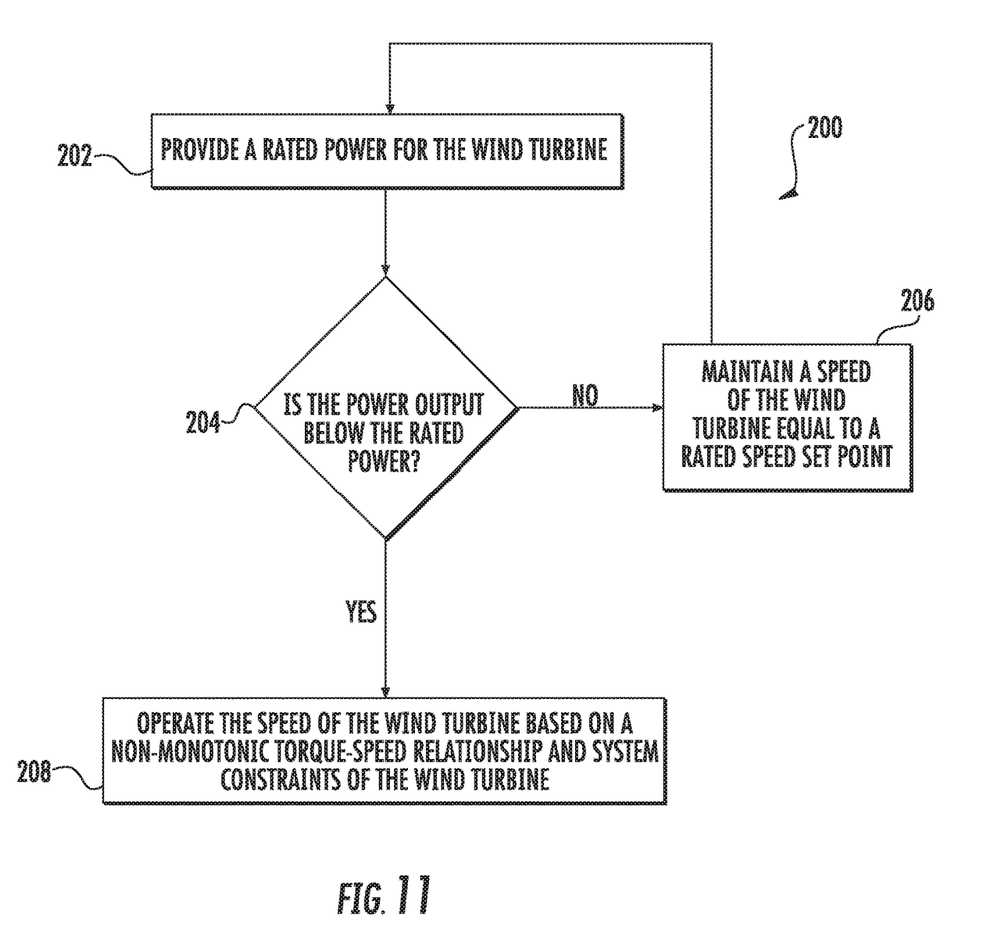
FIG. 11 illustrates a flow diagram of another embodiment of a method for operating a wind turbine during partial load operation according to the present disclosure.

Referring now to FIG. 11, a flow diagram of one embodiment of a method 200 for operating a wind turbine (e.g. the wind turbine 10 of FIG. 1) during partial load operation is illustrated. As shown at 202, the method 200 includes providing a rated power for the wind turbine 10. As shown at 204, the rated power is compared to the power output of the wind turbine 10. As shown at 206, if the power output of the wind turbine 10 is at the rated power, the method 200 includes maintaining a speed of the wind turbine 10 equal to a rated speed set point. In contrast, as shown at 208, if the power output is below the rated power, the method 200 includes operating the speed of the wind turbine 10 based on a non-monotonic torque-speed relationship and system constraints (e.g. mechanical constraints, electrical constraints, and/or thermal constraints) of the wind turbine 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine during partial load operation, the method comprising:
   determining a power output of the wind turbine;
   determining whether the power output is below a rated power of the wind turbine;
   determining the power output is equal to the rated power and in response to the power output being equal to the rated power, maintaining, via a controller, a speed of the wind turbine equal to a rated speed set point;
   determining the wind turbine is operating in a partial load state corresponding to the power output being below the rated power and an operational space existing below system constraints of the wind turbine; and
   during operation of the wind turbine in the partial load state, varying, via the controller, the speed of the wind turbine based on a non-monotonic torque-speed relationship such that the speed during the partial load operation is higher than the speed at the rated power, wherein varying the speed of the wind turbine based on the non-monotonic torque-speed relationship further comprises operating the wind turbine to an increased speed set point that is greater than the rated speed set point at rated power as a function of torque until the system constraints or the rated power are reached.

2. The method of claim 1, wherein varying the speed of the wind turbine based on the non-monotonic torque-speed relationship further comprises:
   decreasing the speed of the wind turbine as a function of the torque after reaching the increased speed set point of the wind turbine above the rated speed set point until rated power is reached.

3. The method of claim 2, wherein decreasing the speed of the wind turbine as a function of the torque after reaching the increased speed set point further comprises:
   decreasing the speed of the wind turbine back to the rated speed set point after at least one of the system constraints is reached.

4. The method of claim 1, further comprising at least one of dynamically calculating the increased speed set point as a function of at least one of the torque or power of the wind turbine or determining the increased speed set point based on at least one of the torque or the power via one or more look-up tables.

5. The method of claim 4, wherein dynamically calculating the increased speed set point as a function of the torque of the wind turbine further comprises:
   receiving, via a turbine controller, the electrical constraints of one or more components from a converter controller of the wind turbine in real-time;

calculating a plurality of intermediate speed set points as a function of the torque of the wind turbine for the electrical constraints; and, selecting one of the plurality of intermediate speed set points to be the speed set point.

6. The method of claim 1, further comprising increasing one or more over-speed condition margins of the wind turbine in response to varying the speed of the wind turbine based on the non-monotonic torque-speed relationship.

7. The method of claim 1, wherein the system constraints comprise mechanical constraints, electrical constraints, and thermal constraints of one or more components of the wind turbine.

8. The method of claim 7, wherein the mechanical constraints of the one or more components of the wind turbine comprise at least one of loads determined by direct measurement, loads calculated based on internal models of the controller, loads calculated based on operational history of the wind turbine, loads calculated based on a wind resource, simulated loading profiles, or combinations thereof.

9. The method of claim 7, wherein the electrical constraints of the one or more components of the wind turbine comprise at least one of a grid condition, a reactive power demand, converter current margins, converter voltage margins, cable ampacity, internal or external power commands, a grid strength, ambient conditions, thermal margins, or temperature.

10. A system for operating a wind turbine during partial load operation, the system comprising:
    a controller comprising one or more processors, the one or more processors configured to perform one or more operations, the one or more operations comprising:
    providing a rated power for the wind turbine;
    comparing a power output of the wind turbine with the rated power;
    determining the power output is equal to the rated power and in response to the power output being equal to the rated power, maintaining a speed set point of the wind turbine equal to a rated speed set point;
    determining the wind turbine is operating in a partial load state corresponding to the power output being below the rated power and an operational space existing below system constraints of the wind turbine; and
    during operation of the wind turbine in the partial load state, varying, via the controller, the speed of the wind turbine based on a non-monotonic torque-speed relationship such that the speed during the partial load operation is higher than the speed at the rated power, wherein varying the speed of the wind turbine based on the non-monotonic torque-speed relationship further comprises operating the wind turbine to an increased speed set point that is greater than the rated speed set point at rated power as a function of torque until the system constraints or the rated power are reached.

11. The system of claim 10, wherein varying the speed of the wind turbine based on the non-monotonic torque-speed relationship further comprises:
    decreasing the speed of the wind turbine as a function of the torque after reaching the increased speed set point of the wind turbine above the rated speed set point until rated power is reached.

12. The system of claim 11, wherein decreasing the speed of the wind turbine as a function of the torque after reaching the increased speed set point further comprises:
    decreasing the speed of the wind turbine back to the rated speed set point after at least one of the system constraints are reached.

13. The system of claim 10, further comprising dynamically calculating the increased speed set point as a function of at least one of the torque or power of the wind turbine.

14. The system of claim 10, further comprising determining the increased speed set point based on at least one of the torque or power via one or more look-up tables.

15. The system of claim 10, wherein the one or more constraints of the system comprise mechanical constraints, electrical constraints, and thermal constraints of one or more components of the wind turbine.

16. The system of claim 15, wherein the mechanical constraints of the one or more components of the wind turbine comprise at least one of loads determined by direct measurement, loads calculated based on internal models of the controller, loads calculated based on operational history of the wind turbine, loads calculated based on a wind resource, simulated loading profiles, or combinations thereof.

17. The system of claim 15, wherein the electrical constraints of the one or more components of the wind turbine comprise at least one of a grid condition, a reactive power demand, converter current margins, converter voltage margins, cable ampacity, internal or external power commands, a grid strength, ambient conditions, thermal margins, or temperature.

* * * * *